(No Model.) 2 Sheets—Sheet 1.

W. F. COLLINS.
DYNAMO ELECTRIC MACHINE.

No. 450,219. Patented Apr. 14, 1891.

WITNESSES:
Frank S. Ober
Thomas K. Trenchard

INVENTOR
William Forman Collins
BY
W. J. Johnston
ATTORNEY.

(No Model.) 2 Sheets—Sheet 2.
W. F. COLLINS.
DYNAMO ELECTRIC MACHINE.
No. 450,219. Patented Apr. 14, 1891.
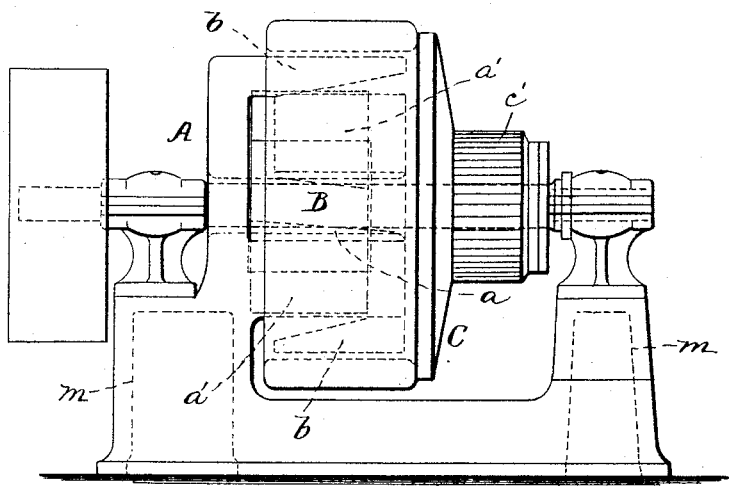
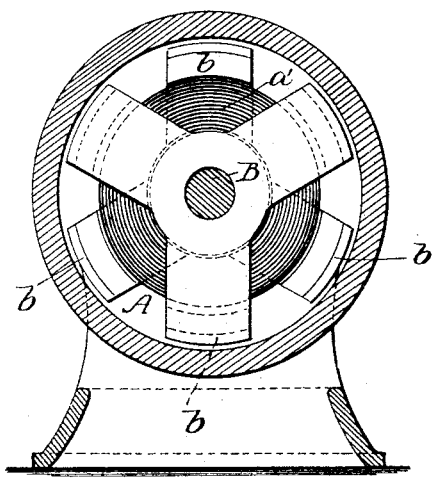
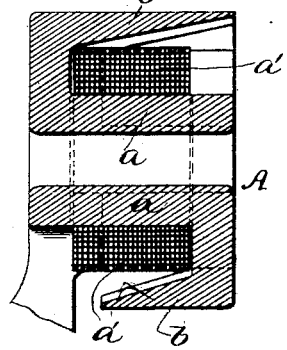
WITNESSES:
INVENTOR
William Forman Collins
BY
ATTORNEY.

UNITED STATES PATENT OFFICE.

WILLIAM FORMAN COLLINS, OF NEW YORK, N. Y., ASSIGNOR TO THE WADDELL-ENTZ ELECTRIC COMPANY, OF SAME PLACE.

DYNAMO-ELECTRIC MACHINE.

SPECIFICATION forming part of Letters Patent No. 450,219, dated April 14, 1891.

Application filed February 18, 1890. Serial No. 340,905. (No model.)

*To all whom it may concern:*

Be it known that I, WILLIAM FORMAN COLLINS, a subject of the Queen of Great Britain, residing in New York city, in the county of New York and State of New York, have invented certain new and useful Improvements in Dynamo-Electric Machines, of which the following is a specification.

My invention relates to improvements in dynamo-electric machines and motors with particular reference to the construction and form of the field-magnet, and has for its object to provide a machine of simple and novel form and light weight which shall be highly efficient in operation and involve the use of but one coil to energize the field-magnet.

In general terms the invention consists of a field-magnet structure which is confined entirely inside of a Gramme ring-armature. This structure consists of a single coil or spool the pole-pieces of which are extended radially across the head of the spool, and then again extended to form the working-poles which stand parallel to the axis of and embracing the spool. If the machine is a multipolar—viz., if there is more than one pole-piece connected with each end of the magnet-core—then the working-poles will alternate with one another around the spool, thus forming a kind of cage within which the spool is confined.

The following is a full, clear, and definite specification of my invention.

Figure 1:
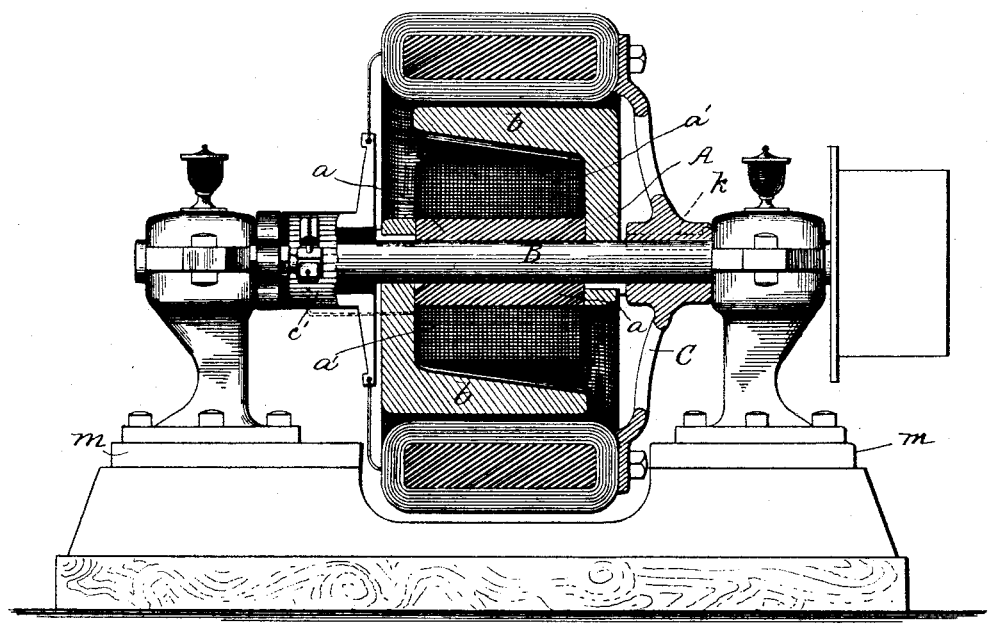
Figure 2:
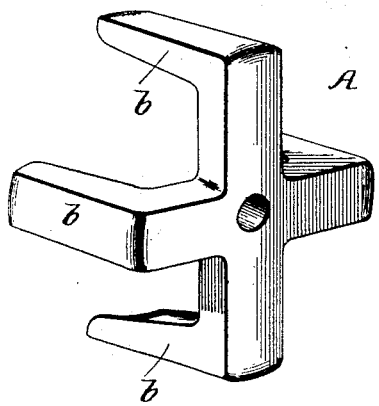
Figure 3:
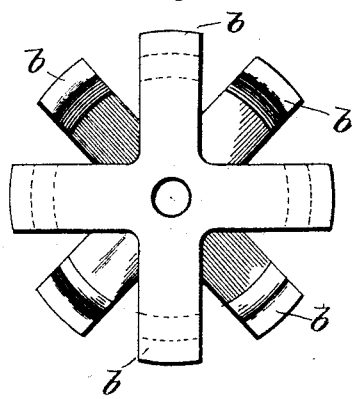

In the accompanying drawings, Figure 1 is a vertical section of my machine, showing the field-magnet as capable of rotation and the armature stationary. Fig. 2 is a perspective view of one set of the pole-pieces of an eight-pole machine. Fig. 3 is an end view of the two sets of pole-pieces together. Fig. 4 is an elevation of a six-pole machine, showing the field-magnet stationary and the armature rotating. Fig. 5 is a section through armature of the same, showing the field-magnet in elevation, and Fig. 6 is a sectional view of the field-magnet and its exciting-coil.

Referring to the drawings by letter, A represents the field-magnet, which is composed of a core $a$, carrying a single coil $a'$ and extended pole-pieces $b$. If the magnet has but two pole-pieces, they will be connected with the core, as shown in Fig. 1, wherein each pole-piece consists of a radial extension passing across the head of a coil, and then turning and extending approximately parallel with the axis of the coil. If the machine is multipolar, then one-half of the number of poles will be connected with the core at each end, and each pole will be a fac-simile of the poles $b$; but the poles at each end will all be connected together, as shown in Fig. 2, and the poles upon the opposite ends of the core will alternate around the axis of the coil, forming a kind of cage, as shown in Fig. 3, within which is confined the magnet-coil. The poles, being connected alternately with the opposite ends of the coil, will have alternate polarity. Now it is obvious that if this structure is rotated inside of an armature—say, for instance, a Gramme ring—a current will be induced in its coils which may be commutated and used. I am aware that a single-coil field-magnet having pole-pieces of the shape herein described is not new; but what I claim is the poles of this form arranged alternately north and south around the coil.

In Fig. 1 the field-magnet is shown keyed to the shaft B, and in consequence rotates with it. The armature remains stationary, being maintained so by the spider C, which is a part of or fixed to one of the pillow-blocks. The commutator $c'$ is loose upon the shaft, while the brush-holder is fixed upon the shaft so as to rotate with it. It is obvious that either the field-magnet or the armature may revolve with the shaft, in which case the other would remain stationary. If the armature is to revolve, the spider is to be made separate from the pillow-block and connected to the shaft by a key $k$, (shown in dotted lines in Fig. 1,) then the opening through the core of the magnet will be made large enough to allow the shaft to rotate freely therein, and the magnet structure will be supported, as shown in Fig. 4, by making it a part of the frame of the machine.

In order to prevent magnetic shunting, a block $m$, of zinc or other non-magnetic material, will be inserted in the frame of the machine. It is to be observed that this form of field-magnet may be used in the alternating-current machine, in which case the number of pole-pieces would probably be increased.

Having thus described my invention, I claim—

1. In a dynamo-electric machine or motor, the combination, with an armature, of a field-magnet consisting of a single coil of wire surrounding an iron core, two sets of pole-pieces, one set connected with each end of the iron core, the pole-pieces of each end extending across the head and side of the coil and standing in alternate planes around the same, and the working-faces of said pole-pieces being substantially parallel to the axis of the coil.

2. In a dynamo-electric machine or motor, a field-magnet consisting of a single coil of wire wound upon an iron core, in combination with two sets of pole-pieces, one set connected with each end of the core, the pole-pieces of each set extending across the head and side of the coil, overlapping each other and standing in alternate radial planes.

3. In a dynamo-electric machine or motor, a field-magnet consisting of a single coil of wire wound upon an iron core and a plurality of pole-pieces or horns connected with each end of the same extending around the coil, the poles or horns of each set extending past a plane cutting the axis of the coil at right angles.

4. In a dynamo-electric machine or motor, a field-magnet consisting of a single coil of wire wound upon an iron core and a plurality of pole-pieces or horns connected with each end of the same extending around the coil, the poles or horns of each set extending past a plane cutting the axis of the coil at right angles, the poles of each set being also arranged in alternating radial planes.

5. In a dynamo-electric machine or motor, a field-magnet consisting of a single coil of wire wound upon an iron core and a plurality of pole-pieces or horns connected with each end of the same extending around the coil, the poles or horns of each set extending past a plane cutting the axis of the coil at right angles, in combination with a ring-armature, within which the said field-magnet is located.

In witness whereof I have signed my name in the presence of two subscribing witnesses.

WILLIAM FORMAN COLLINS.

Witnesses:
THOMAS K. TRENCHARD,
DUDLEY COVERLY.